United States Patent
Chen et al.

(10) Patent No.: US 11,417,163 B2
(45) Date of Patent: Aug. 16, 2022

(54) SYSTEMS AND METHODS FOR KEY FOB MOTION BASED GESTURE COMMANDS

(71) Applicant: Byton North America Corporation, Santa Clara, CA (US)

(72) Inventors: Abraham Tai-Yu Chen, San Jose, CA (US); Benoit Le Bourgeois, San Jose, CA (US); Rene Limberger, Gilroy, CA (US)

(*) Notice: Subject to any disclaimer, the term of this patent is extended or adjusted under 35 U.S.C. 154(b) by 0 days.

(21) Appl. No.: 16/240,453

(22) Filed: Jan. 4, 2019

(65) Prior Publication Data

US 2020/0219338 A1  Jul. 9, 2020

(51) Int. Cl.
| G07C 9/29 | (2020.01) |
| G07C 9/00 | (2020.01) |
| G06F 3/01 | (2006.01) |
| B60R 25/00 | (2013.01) |

(52) U.S. Cl.
CPC .............. *G07C 9/29* (2020.01); *B60R 25/002* (2013.01); *G06F 3/017* (2013.01); *G07C 9/00658* (2013.01); *G07C 9/00944* (2013.01)

(58) Field of Classification Search
CPC .. G07C 9/29; G07C 9/00944; G07C 9/00658; B60R 25/002; G06F 3/017
USPC ..................................... 340/5.61, 992; 701/2
See application file for complete search history.

(56) References Cited

U.S. PATENT DOCUMENTS

| 6,571,193 B1* | 5/2003 | Unuma ................. A43B 3/0005 |
| | | 340/853.2 |
| 7,176,888 B2* | 2/2007 | Marvit .................. G06F 1/1613 |
| | | 345/156 |
| 7,301,528 B2* | 11/2007 | Marvit .................. G06F 1/1626 |
| | | 345/156 |
| 9,346,470 B2* | 5/2016 | Mittermeier ....... G07C 9/00182 |

(Continued)

FOREIGN PATENT DOCUMENTS

| CN | 104464040 A | 5/2015 |
| CN | 104918212 A | 9/2015 |

(Continued)

OTHER PUBLICATIONS

The International Search Reporting and Written Opinion of the International Searching Authority for PCT Application No. PCT/CN2019/130616 dated Mar. 31, 2020, 8 pages.

(Continued)

*Primary Examiner* — Nam V Nguyen
(74) *Attorney, Agent, or Firm* — Womble Bond Dickinson (US) LLP (57) ABSTRACT

Disclosed is a method and apparatus for controlling vehicle systems. The method may be performed by a mobile device and a vehicle, and may include capturing motion data generated by one or more sensors of the mobile device. The method may also include generating a motion signature, indicative of a motion of the mobile device, from the captured motion data. Furthermore, when the generated motion signature matches a predefined motion signature stored in a memory of the mobile device, the method may (Continued)

include transmitting a motion based gesture command associated with the predefined motion signature to a vehicle. Additionally, the method may include operating one or more of the vehicle systems in response to a processor of the vehicle executing the received motion based gesture command.

28 Claims, 7 Drawing Sheets

(56) References Cited

U.S. PATENT DOCUMENTS

| | | | | |
|---|---|---|---|---|
| 9,593,522 | B1* | 3/2017 | Murar | E05F 15/77 |
| 9,720,515 | B2* | 8/2017 | Wagner | G06F 3/017 |
| 10,137,777 | B2* | 11/2018 | Lu | B60H 1/00357 |
| 10,284,822 | B2* | 5/2019 | Murar | G06V 20/56 |
| 10,413,218 | B2* | 9/2019 | Yamato | A61B 5/1118 |
| 10,521,574 | B2* | 12/2019 | Olofsson | G06F 21/316 |
| 10,986,466 | B2* | 4/2021 | Dekovich | H04W 4/40 |
| 2007/0222746 | A1* | 9/2007 | LeVine | G06F 3/0346 |
| | | | | 345/156 |
| 2007/0280167 | A1 | 12/2007 | Olexa et al. | |
| 2010/0052931 | A1* | 3/2010 | Kolpasky | B60R 25/00 |
| | | | | 340/670 |
| 2012/0249291 | A1* | 10/2012 | Holcomb | G07C 9/00563 |
| | | | | 340/5.51 |
| 2013/0259232 | A1 | 10/2013 | Patel | |
| 2014/0136024 | A1 | 5/2014 | Herthan | |
| 2014/0188309 | A1 | 7/2014 | Caratto et al. | |
| 2014/0240091 | A1 | 8/2014 | Talty et al. | |
| 2014/0274013 | A1 | 9/2014 | Santavicca | |
| 2014/0379175 | A1 | 12/2014 | Mittermeier | |
| 2015/0128497 | A1 | 5/2015 | Schuetz et al. | |
| 2015/0279131 | A1* | 10/2015 | Nespolo | G08C 17/00 |
| | | | | 340/5.72 |
| 2016/0320469 | A1 | 11/2016 | Laifenfeld et al. | |
| 2017/0092028 | A1* | 3/2017 | Weicker | G07C 9/00309 |
| 2017/0105101 | A1* | 4/2017 | Santavicca | H04W 4/023 |
| 2017/0282856 | A1* | 10/2017 | Riedel | B60R 25/24 |
| 2018/0099643 | A1* | 4/2018 | Golsch | G07C 9/00309 |
| 2018/0349373 | A1* | 12/2018 | Sauerwein, Jr. | G05B 19/0425 |
| 2019/0297592 | A1 | 9/2019 | Lindquist et al. | |
| 2019/0311298 | A1 | 10/2019 | Kopp et al. | |
| 2020/0005566 | A1 | 1/2020 | Jain et al. | |
| 2020/0070777 | A1 | 3/2020 | Chen et al. | |

FOREIGN PATENT DOCUMENTS

| | | |
|---|---|---|
| CN | 107074281 A | 8/2017 |
| CN | 107848489 A | 3/2018 |
| WO | 2018024399 A1 | 2/2018 |
| WO | 2018059725 A1 | 4/2018 |

OTHER PUBLICATIONS

Sun, et al., "A 3-D hand gesture signature based biometric authentication system for smartphones," Security and Communication Network, 2016, pp. 1359-1373, vol. 9, John Wiley & Sons, Ltd.
International Preliminary Report on Patentability issued from Patent Cooperation Treaty dated Jun. 16, 2021 for International application No. PCT/CN2019/130616, 5 pages.

* cited by examiner

SYSTEMS AND METHODS FOR KEY FOB MOTION BASED GESTURE COMMANDS

FIELD

The disclosed embodiments relate generally to vehicle systems and in particular, but not exclusively, to key fobs controlling vehicle systems with motion based gesture commands.

BACKGROUND

Vehicles, such as cars, trucks, trains, etc., generally include a lock to prevent unauthorized access to the vehicle, as well as to prevent the unauthorized starting and operation of the vehicle. While such locks used to involve physical keys, more and more vehicles are using wireless entry and ignition systems. With wireless entry and ignition systems, when the key fob is verified by the vehicle, the user is electronically granted access to the vehicle and/or the ability to start and operate the vehicle. Typically, the key fob and the vehicle continue to exchange data so that they vehicle can ensure that the key fob, and thus the operator, are still in proximity to the vehicle during operation.

Furthermore, key fobs may include one or more physical buttons, that when pressed, cause the vehicle to perform one or more functions. For example, pressing a first button may unlock the doors of a vehicle, while pressing a second button may start the vehicle's ignition system. The functions provide rudimentary control of the vehicle, and the functions are linked to the buttons of the key fob.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
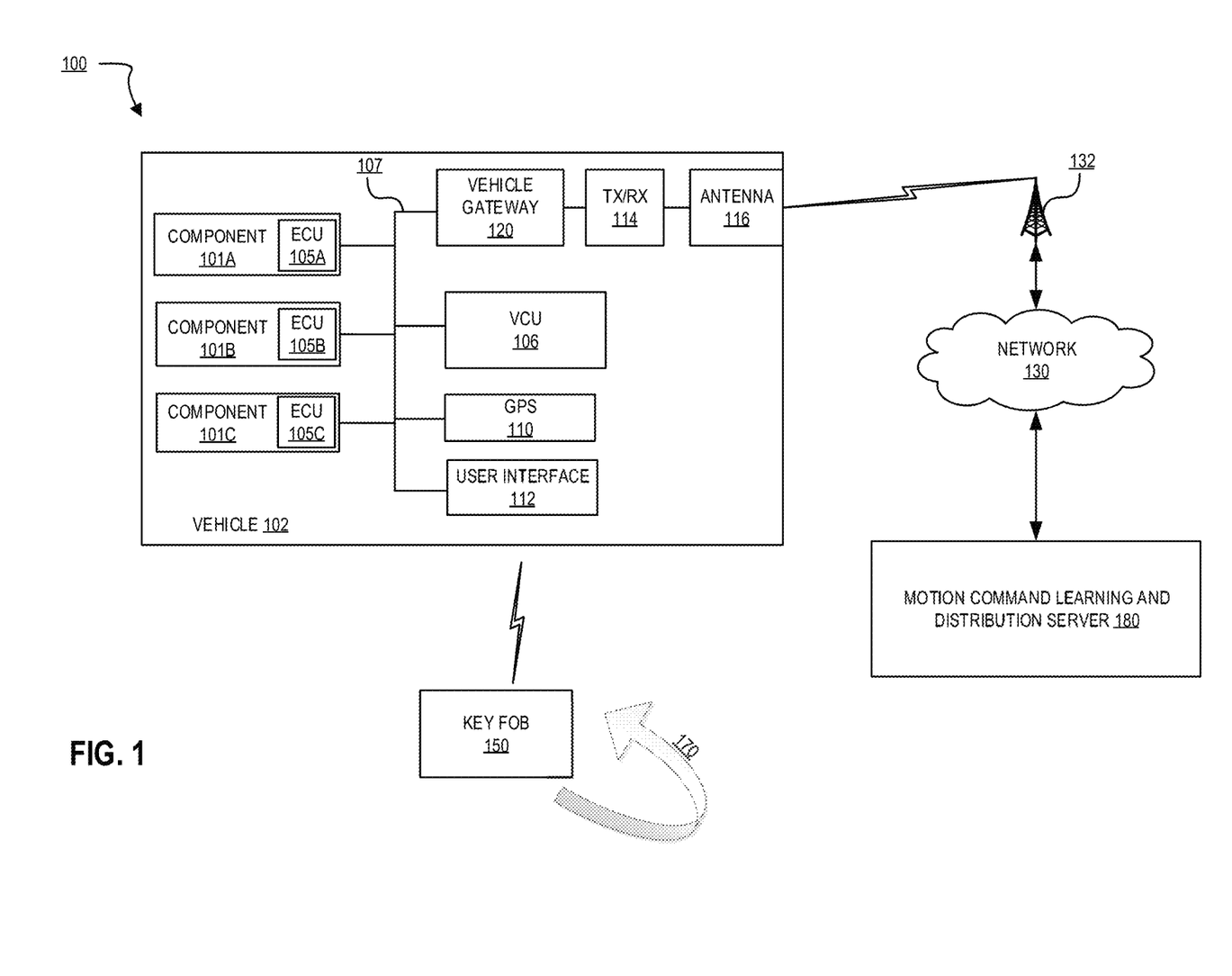
FIG. 1 is a block diagram of an exemplary system architecture for utilizing motion based key fob gesture commands to control one or more vehicle systems.

FIG. 1 is a block diagram of an exemplary system architecture 100 for utilizing motion based key fob gesture commands to control one or more vehicle systems. System 100 enables key fob 150 generated motion based gesture commands to control one or more systems of vehicle 102. System 100 further enables vehicle 102 and other vehicles (not shown) to provide motion data and associated motion based gesture commands to motion command learning and distribution server 180, so that motion command learning and distribution server 180 can refine motion signatures associated with commands based on a corpus of motion data received from a plurality of different vehicles, users, key fobs, etc. The systems and processes are discussed in greater detail herein.

In embodiments, vehicle 102 may be a fully electric vehicle, partially electric (i.e., hybrid) vehicle, non-electric vehicle (i.e., a vehicle with a traditional internal combustion engine). Furthermore, although described mostly in the context of automobiles, the illustrated systems and methods can also be used in other wheeled vehicles such as trucks, motorcycles, buses, trains, scooters, etc. It can also be used in non-wheeled vehicles such as ships, airplanes (powered or gliders), and rockets. In fact, the illustrated embodiments can be used in any situation in which a key fob is used to access a vehicle.

System 100 includes vehicle 102 communicatively coupled to motion command learning and distribution server 180 via network 130. In the context of this application, "communicatively coupled" means coupled in such a way that data can be exchanged, in one or both directions, between two entities or components (e.g., between the vehicle 102 and the motion command learning and distribution server 180). In embodiments, motion command learning and distribution server 180 may be comprised of two or more server computer systems distributed over network 130.

In embodiments, key fob 150 is a hardware device capable of wirelessly transmitting and receiving data, and performing motion data capture, motion based gesture command generation, and motion based gesture command communication processes, as discussed in greater detail herein. Key fob 150 may be a purpose built device that's primary function is as a wireless key for providing access to, and enabling operation of, vehicle 102. In embodiments, key fob 150 may be water resistant to provide continuous use in inclement weather, when dropped in a puddle, etc., and may also include a physical key for providing access to vehicle 102 via a corresponding key cylinder of the vehicle 102, for example during an emergency, in response to a dead batter of key fob, by a user uncomfortable with keyless entry systems, etc. In embodiments, however, key fob 150 may be any wireless device with a transceiver, memory, motion sensor, and processor configured to perform the processes discussed herein. For example, a smartphone, smart watch, wearable device, tablet computer, or other wireless device may be configured to perform the functions of key fob 150, such as by execution of an application associated with a manufacturer of vehicle 102. However, to avoid obscuring embodiments of the present invention, the remainder of the present disclosure will refer to key fobs, but should not be limited thereto.

In one embodiment, vehicle 102 includes one or more systems, such as components 101, each having an electronic control unit (ECU) 105, and each ECU 105 is communicatively coupled via a communications network 107 to a vehicle control unit (VCU) 106. The communications network 107 may be a controller area network (CAN), an Ethernet network, a wireless communications network, another type of communications network, or a combination of different communication networks. VCU 106 is also communicatively coupled to other vehicle systems, such as a GPS unit 110, a user interface 112, and a transceiver 114. Transceiver 114 is communicatively coupled to an antenna 116, through which motor vehicle 102 can wirelessly transmit data to, and receive data from, motion command learning and distribution server 180 and key fob 150. In the illustrated embodiment, vehicle 102 communicates wirelessly via antenna 116 with a tower 132, which can then communicate via network 130 (e.g., a cellular communication network, a local area network, a wide are network, a combination of networks, etc.) with motion command learning and distribution server 180. In embodiments, vehicle 102 may also communicate with key fob 150 via antenna 116, for example, to provide refined motion signatures for detection and use of motion based gesture command by key fob 150.

Components 101 are generally components of the systems of the vehicle 102. For example, components 101 can include adjustable seat actuators, power inverters, window controls, electronic braking systems, trunk and door controls, automatic ignition systems, convenience systems such as heating and/or air conditions systems, audiovisual systems, etc. Vehicle control unit (VCU) 106 is another vehicle 102 system that serves as a controller including a microprocessor, memory, storage, and a communication interface with which it can communicate with components 101, global positioning system (GPS) 110, user interface 112, and transceiver 114 via network 107. In one embodiment VCU 106 is the vehicle's main computer, but in other embodiments it can be a component separate from the vehicle's main or primary computer.

In embodiments, as discussed in greater detail below, key fob 150 is a hardware device that includes a memory, processor, wireless transceiver, and one or more motion sensors (e.g., accelerometers, gyroscopes, inertial measurement units, etc.). In embodiments, key fob 150 receives (e.g., from vehicle 102 or factory installed) and stores initial motion signatures and associated motion based gesture commands. In embodiments, the motion signatures represent patterns of motion data that can be generated from raw data collected from one or more motion sensors. For example, acceleration, velocity, time, 3D location, coordinates, and/or other motion data generated by motion sensors may be used to generate motion signatures, such as generation of a feature vector, a feature matrix, or other representation of motion data. For example, where key fob 150 includes an inertial measurement unit, the inertial measurement unit includes an accelerometer and gyroscope that generate acceleration measurements, force measurements, angular rate measurements, etc. over time. A sampling of the measurements generated by the IMU and the pattern of data represented by those measurements may therefore be associated with specific motion signatures. Continuing the example, measurements of acceleration, force, angular rate, etc. are different over time when key fob 150 is moved in a circular motion when compared to a zig zag motion. Thus, a number of measurements over time, which may be stored in a vector, matrix or other representation, may therefore represent specific motions as motion signatures. In embodiments, different types of motion data, time frames, number of data points for different motion data, etc. may be used to represent motion signatures of motions of the key fob 150, as discussed herein. Furthermore, each motion signature is associated with a motion based gesture command, which when communicated from the key fob 150 to vehicle 102 enables the VCU 106 to control operation of one or more vehicle systems (e.g., door, trunk, ignition, lights, convenience systems, audiovisual systems, etc.) using the received motion based gesture command.

In one embodiment, key fob 150 includes a battery (now shown) that has limited power. In one embodiment, key fob 150 includes mechanisms to recharge the battery, e.g. by converting motion energy into electric energy or by converting environmental energy sources such as sunlight into electric energy. Because constantly capturing and analyzing motion sensor data by key fob 150 would place an undue strain on the key fob's 150 battery, in an embodiment, key fob 150 utilizes a trigger (e.g., a button press and/or hold, a voice command, a presence sensor, or other trigger) to initiate motion data capture using motion sensors of the key fob 150. In embodiments, the one or more motion sensors of key fob 150, responsive to the trigger being detected by key fob, capture motion data (e.g., acceleration, velocity, time, 3D location, coordinates, and/or other motion data measured by motion sensors, such as an IMU) indicative of motion 170 of the key fob 150 over time. The motion 170 may be the result of a user of key fob 150 moving the key fob in a predefined motion pattern, such as upward, downward, clockwise rotation, counterclockwise rotation, zig zag upward, zig zag downward, an arc, a u-shape, an upside down u-shape, as well as other patterns of motion. Key fob 150 then analyzes the captured motion sensor data to generate a motion signature defining the detected motion 170, for example by generating a vector, matrix, or other data structure having sensor measurements (e.g., accelerations, forces, angular rates, etc.) sampled over a period of time. Key fob 150 compares the generated motion signature with stored motion signatures to detect when a match occurs, such as by performing a statistical analysis on a similarity of the generated motion signature data with a stored motion signature data to determine when their similarity satisfies a predefined threshold (e.g., 80%, 90%, 95%, etc. likely to be a match). A match between a captured motion signature and a predefined motion signature (e.g., one stored by key fob and associated with a gesture command), as discussed herein, indicates that the user of key fob 150 intends to control a system of vehicle via a gesture command. Based on the matched motion signatures, key fob 150 generates and wirelessly transmits a corresponding motion based gesture command to vehicle 120.

Vehicle 102 receives the motion based gesture command and executes the command with respect to one or more systems of the vehicle 102. For example, a motion based gesture command may be associated with an upward motion of key fob 150, which the vehicle 102 uses to open a trunk of vehicle 102. Another motion command may be associated with a downward motion of key fob 150, which the vehicle 102 uses to close the trunk of vehicle 102. Furthermore, one or more characteristics of the motion command, such as velocity of the detected motion can configure the resulting gesture based motion command. For example, a fast upward motion may fully open the vehicle's 102 trunk, while a slow upward motion may open the vehicle's 102 trunk half way. Similarly, a fast counter-clockwise rotational motion may fully roll down a vehicle's windows, while a slow clockwise rotational motion may roll the vehicles windows up halfway. Other motions, motion commands, and motion signatures may be used to control systems of vehicle 102 as discussed herein. Therefore, aspects of the captured motion (e.g., speed, direction, etc.) can configure the command as executed by vehicle 102 to provide a user of key fob 150 a fine grain level of control of the executed motion commands when operating and controlling vehicle systems. Furthermore, the specific motions, motion signatures generated therefrom, and associated commands are able to accurately capture a wide array of motions/commands for improving how a user can control the systems of vehicle 102 remotely. Additionally, usage of the trigger to initiate motion capture and motion command usage ensures that unintended or accidental use of key fob 150 is minimized and that the limited battery of the key fob 150 is not unduly consumed by the motion command processes discussed herein.

In one embodiment, key fob 150 may also transmit data in addition to or instead of the motion command, such as the motion data captured by the motion sensors, a key fob identifier, a user identifier, etc., to vehicle 102. In embodiments, vehicle 102 may use the received motion data, for example, to generate a motion signature and matching (e.g., using statistical or other analysis) the vehicle 102 generated motion signature with the those of motion commands recognized by vehicle 102. Thus, when the motion command determined by the vehicle 102 matches the received motion command from the key fob 150, vehicle 102 can verify the accuracy of the received motion based gesture command generated by the key fob 150. That is, in embodiments, vehicle 102 can cross-check the motion based gesture command generated by key fob 150 before a vehicle system is controlled based on the received motion based gesture command. When the command can be verified by the vehicle 102 from received motion data, vehicle 102 executes the command to control one or more vehicle systems (e.g., roll windows down, open a trunk, star a vehicle's heater, etc.). When the command cannot be verified by the vehicle 102 from received motion data, vehicle 102 does not execute the command. In some embodiments, vehicle 102 may receive motion data captured by the key fob 150 without receiving an associated motion command form the key fob 150. In this embodiment, vehicle 102 generates a motion signature from the received motion data, performs matching with motions signatures of motion based commands, and executes a motion based command when a match occurs, similar to the discussion herein.

In embodiments, vehicle 102 may further store received motion data and associated motion commands regardless of whether vehicle 102 is able to verify the associated command. In this embodiment, vehicle 102 may perform one or more machine learning processes (e.g., neural network training, support vector machine training, etc.) for the motion command utilizing the received motion data as training data to refine a motion signature associated with corresponding motion command. That is, a motion signature's data (e.g., accelerations, forces, angular movement, etc. over time may be expanded, values adjusted, etc. based on the machine learning analysis to enable the motion signature to improve matching with specific users, key fobs, etc., as well as to improve matching between different users. In embodiments, if key fob identifiers and/or user identifiers are also associated with received motion data, the machine learning refinement of motion signatures for associated motion commands can be refined per user and/or per key fob. Vehicle 102 then periodically transmits the refined motion signatures to key fob 150 for storage and usage by the key fob 150. Thus, the motion signatures for motion based gesture commands are improved in terms of accuracy for specific users (e.g., user A's clockwise motion for rolling up a window may differ from user B's clockwise motion for rolling up a window, which is reflected in refined data values in a motion signature for user A), improved for specific key fobs (e.g., key fob X's zig zag up pattern of motion for unlocking a vehicle's doors is different from key fob Y's zig zag up pattern of motion for unlocking a vehicle's doors, which is reflected in refined data values in a motion signature for key fob X), improved based on user characteristics (e.g., user M from region I uses a specific motion defined by regional custom to open a trunk, while user N from region II users a different motion defined by regional custom to open a trunk, which is reflected in refined data values in a motion signature for user M and/or users of region I), etc. Furthermore, vehicle 102 may enable a user to specify motions and associated commands to enable the user and/or key fob to customize motions that trigger certain commands, such as when more than one user and/or key fob may use the same vehicle.

Figure 5:
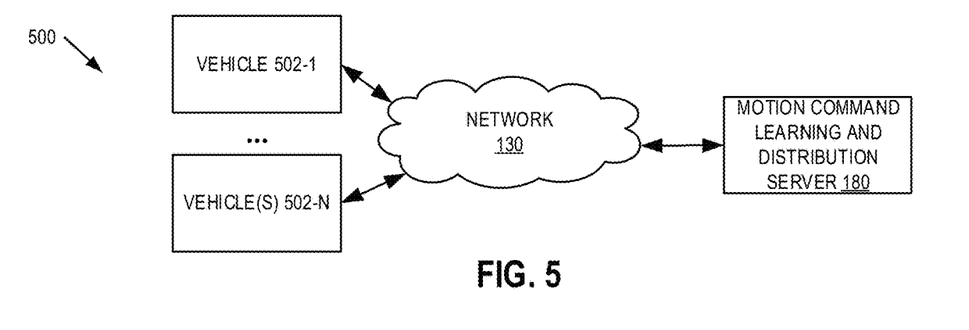
FIG. 5 is block diagram of one embodiment of a system including a plurality of vehicles and a motion command learning and distribution server for utilizing crowd sourced motion command data to refine motion signatures for motion based gesture commands.

In one embodiment, vehicle 102 may also transmit saved motion signature data and associated motion commands to motion command learning and distribution server 180. In embodiments, motion command learning and distribution server 180 may also perform machine learning based motion signature refinement, similar to that performed by vehicle 102. For example, a corpus of data inputs representing specific data used by one or more key fobs, one or more users, etc. in generating motion commands may be input as training data into a machine learning model (e.g. a neural network). The training data enables the machine learning model to adjust a representative motion signature based on real world data to be more accurate with respect to later key fob usage. In embodiments, motion command learning and distribution server 180 receives motion data and associated motion commands from a plurality of vehicles (e.g., vehicles 502-1 through 502-N illustrated in FIG. 5), and may optionally also receive user, key fob, or other identifiers. However, in some embodiments, the motion data and commands are not identified by user/key fob to better preserve user privacy. Motion command learning and distribution server 180 may then periodically perform a machine learning based refinement of general motion signatures associated with motion commands, may periodically refine motion signatures based on geographic region, may periodically refine motion signatures by user group, may refine motion signatures for specific users and/or key fobs, etc. Over time, motion command learning and distribution server is therefore able to improve the accuracy of motion commands, such as by adjustment, expansion, etc. of motion signature data (e.g., motion vectors, motion matrices, or other motion data signature representations) associated with specific motion commands for a specific users, groups of users, geographical regions, etc. Motion command learning and distribution server 180 may then periodically transmit the refined motion signatures and an indication of associated motion command to vehicles, including vehicle 102. Vehicle 102 may then user the received motion signature for verification of received user motion signatures (e.g., as discussed above), may refine a user' specific motion signatures, and may further distribute the received motion signature to key fob 150. Therefore, motion command learning and distribution server 180 is also able to refine the accuracy of motion signatures to improve key fob's 150 motion based gesture command generation, and thus the resulting control of the systems of vehicle.

Figure 2:
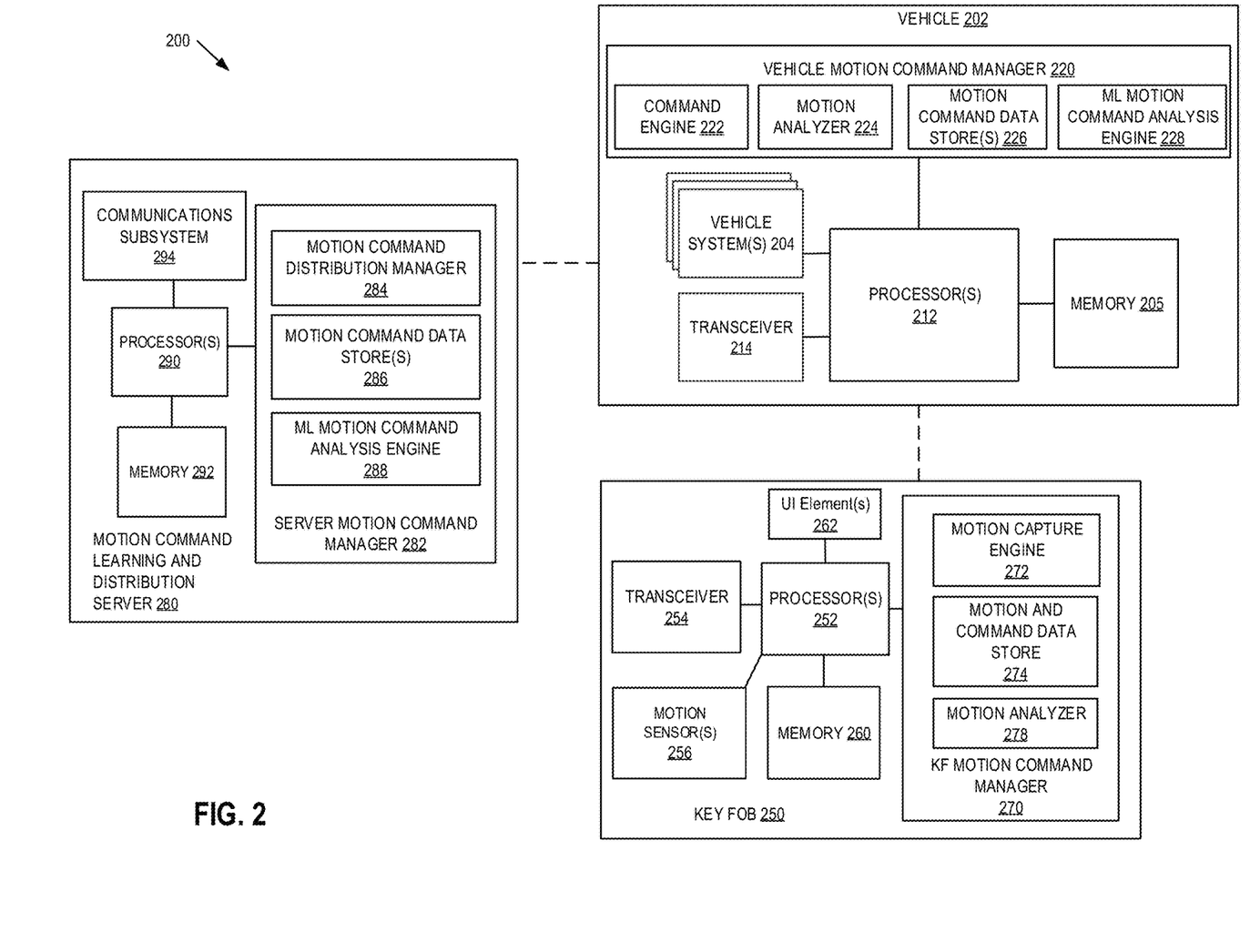
FIG. 2 is block diagram of one embodiment of a system including a vehicle, a key fob, and a motion command learning and distribution server.

FIG. 2 is block diagram of one embodiment of a system 200 including a vehicle 202, key fob 250, and a motion command learning and distribution server 280. Vehicle 202, key fob 250, and motion command learning and distribution server 280 provide additional details for vehicle 102, key fob 150, and motion command learning and distribution server 180 discussed above in FIG. 1.

In one embodiment, vehicle 202 is a system, which may include one or more processor(s) 212, a memory 205, and a transceiver 214. It should be appreciated that vehicle 202 may also include, although not illustrated, a user and/or hardware interface, vehicle controls, one or more power device(s) (e.g., vehicle battery, drive control system, a propulsion system such as an electric, gasoline, or electric/gasoline hybrid powered motor), a steering system, a braking system, as well as other components typically associated with vehicles. Vehicle 202 may also include one or more vehicle system(s) 204 (e.g., VCUs, positioning systems, convenience systems, audiovisual systems, etc.). In embodiments, transceiver 214 may be a network interface capable of communicatively coupling vehicle 202 to any number of wireless subsystems (e.g., Bluetooth, WiFi, Cellular, or other networks), internal motor vehicle communication networks (e.g., a CAN bus, an Ethernet network, a wireless network, etc.) to transmit and receive data streams through one or more communication links to key fob 250 and/or motion command learning and distribution server 280.

In one embodiment, key fob 250 is a wireless device, which may include one or more processor(s) 252, a memory 260, one or more motion sensor(s) 256 (e.g., one or more of an accelerometer, gyroscope, inertial measurement unit, etc.), a transceiver 254, and one or more user interface elements 262 (e.g., button(s)). In embodiments, transceiver 254 is a personal area network transceiver, such as a Bluetooth, BLE, Zigbee, or other personal area network transceiver. It should be appreciated that key fob 250 may also include, although not illustrated, a user interface (e.g., keyboard, touch-screen, or similar devices), a power device (e.g., a battery), a display screen (e.g., an LCD display), as well as other components typically associated with wireless devices. As discussed above, key fob 250 may be implemented as a purpose built device, or utilize the hardware and processing resources of a mobile telephone, smart watch, etc.

In one embodiment, motion command learning and distribution server 280 is also a system, which may include one or more processor(s) 290, a memory 292, and a communications subsystem 294. In embodiments, communications subsystem 294 may be a network interface capable of communicatively coupling motion command learning and distribution server 280 to any number of wireless subsystems (e.g., Bluetooth, WiFi, Cellular, or other networks) to transmit and receive data streams through one or more communication links to vehicle 202. In embodiments, motion command learning and distribution server 280 is a server computer system that may include a plurality of hardware and/or virtualized computer systems collocated and/or distributed form one another. Various server computer configurations may be utilized consistent with the discussion herein.

In embodiments, the memories (e.g., memory 205, memory 260, and memory 292) of vehicle 202, key fob 250, and motion command learning and distribution server 280 may be coupled to processor(s) to store instructions for execution by their respective processors, such as processor (s) 212, processor(s) 252, and processor(s) 290. In some embodiments, the memory is non-transitory, and may store one or more processing modules. In one embodiment, memory 205 of vehicle 202 may store one or more processing modules of a vehicle motion command manager 220, such as a command engine 222, motion analyzer 224, motion command data store(s) 226, and machine learning motion command analysis engine 228, to implement embodiments described herein. Furthermore, memory 260 of key fob 250 may also store one or more processing modules of a key fob motion command manager 270, including a motion capture engine 272, motion and command data store 272, and motion analyzer 278, to implement embodiments discussed herein. Additionally, memory 292 of motion command learning and distribution server 280 may also store one or more processing modules of a server motion command manager 282, including a motion command distribution manager 284, motion command data store(s) 286, and machine learning command analysis engine 288, to implement embodiments discussed herein.

It should be appreciated that the embodiments as will be hereinafter described may be implemented through the execution of instructions, for example as stored in memory or other element, by processor(s) and/or other circuitry of vehicle 202, key fob 250, and motion command learning and distribution server 280. Particularly, circuitry of vehicle 202, key fob 250, and motion command learning and distribution server 280, including but not limited to their respective processors may operate under the control of a program, routine, or the execution of instructions to execute methods or processes in accordance with the aspects and features described herein. For example, such a program may be implemented in firmware or software (e.g. stored in memory) and may be implemented by processors and/or other circuitry. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines, or modules described herein may be performed by vehicle 202, key fob 250, and motion command learning and distribution server 280 and/or some or all of the functions, engines or modules described herein may be performed by another system connected through a network interface. Thus, some and/or all of the functions may be performed by another system, and the results or intermediate calculations may be transferred back to vehicle 202, key fob 250, and motion command learning and distribution server 280.

In one embodiment, key fob 250 utilizes motion and command data store 274 to store motion signatures and associated motion based gesture commands. As discussed above, the motion signatures are transformed from motion data captured by sensors, such as motion sensor(s) 256 (e.g., an IMU, one or more accelerometers, one or more gyros, other motion sensor(s), or a combination of sensor(s)). For example, the motion signatures are generated from specific patterns of motion (e.g., movement up, movement down, counter-clockwise rotation, clockwise rotation, zig zag up, zig zag down, etc. reflected in the acceleration, force, angular movement, etc. motion data over time generated by the motion sensor(s) 256), and motion based gesture commands (e.g., open trunk, close trunk, roll window down, roll window up, unlock vehicle, lock vehicle, etc.) that are associated with respective motion signatures.

In embodiments, motion analyzer 278 of key fob motion command manager 270 generates motion signatures from raw motion data generated by motion sensor(s) 256 in response to motion capture engine 272 detecting a trigger (e.g., a user depressing a button or interacting with another user-interface element 262 in a predefined way, such as holding a button during a motion command). The motion signatures may be generated by performing motion analysis of accelerometer, gyroscope, and other motion sensor(s) 265 to generate a motion signature indicative of a motion experienced by key fob 250, such as by sampling one or more of the accelerations, forces, angular movements, etc. generated by the motion sensor(s) 256 over a period of time. Motion analyzer 278 may then use the generated motion signature for comparison with existing motion signatures stored in motion and command data store 274, for example, to determine a statistically relevant likelihood that that generated motion signature matches a motion signature associated with a command in data store 274. When a match is found, motion analyzer 278 transmits a motion based gesture command associated with the matched motion signatures to vehicle 202 via transceiver 254. In one embodiment, motion data that was used to generate the command, one or more user identifiers, one or more key fob identifiers, and other metadata may also be transmitted to vehicle 202 with the motion based gesture command.

Vehicle 202 receives the motion based gesture command, and optionally the additional data, via transceiver 214. Vehicle motion command manager 220 stores the additional data (e.g., motion data and identifier(s) with associated motion based gesture commands) in motion command data store(s) 226. The data store(s) 226 may include one or more data stores for separately storing motion data, identifiers, etc. for individual users and/or key fobs. Command engine 222 receives the motion based gesture command, and in embodiments, generates a motion signature from received motion data using motion analyzer 224. In this embodiment, motion analyzer 224 may independently use the motion data captured by key fob 250 to generate a motion signature from the received motion data and determine an associated gesture based motion command, as discussed herein. Command manager 222 uses this independent determination to verify the motion based gesture command received from key fob 250 (e.g., by comparing the independently generated motion command by vehicle 202 with the motion command received from key fob 250). When there is a match, command engine 222 executes the specified motion based gesture command by configuring one or more of vehicle system(s) 204. For example, command engine may unlock/lock vehicle 202, open/close a trunk, roll windows down/up, activate a convenience system, start a vehicle ignition system, turn on an audiovisual system, etc. In embodiments, where motion data is not received along with a motion based gesture command, command engine 222 implements the command without verification. Alternatively, motion data may be received from key fob 250 without an associated motion command, in which case vehicle motion command manager 220 generates a motion command, as discussed herein, without input of a command from the key fob 250.

In one embodiment, machine learning motion command analysis engine 228 of vehicle motion command manager 220 periodically accesses motion command data store(s) 226. As discussed herein, machine learning motion command analysis engine 228 periodically performs a machine learning processes using received motion data as training data to refine existing motion command signatures. For example, machine learning motion command analysis engine 228 may utilize a neural network, or other machine learning technique, to refine a motion signature based on the motion data associated with verified motion based gesture commands by inputting the training data into the a machine learning model (e.g. a neural network), which adjusts motion signature values from the training data. Vehicle 202 then transmits the refined motion signatures to key fob 250, which are replaced in motion and command data store 274 to provide refined motion signature generation and matching.

Machine learning motion command analysis engine 228 may also periodically transmit motion data and verified commands to motion command learning and distribution server 280. Similar to the processes performed at vehicle 202, server motion command manager 282 utilizes motion command distribution manager 284 to store received motion data and associated commands in motion command data store(s) 286. Furthermore, motion command distribution manager 284 receives motion data and commands from a plurality of vehicles (e.g., vehicle 502-1 through 502-N illustrated in FIG. 5). The data store(s) 286 may be organized by motion command distribution manager 284 by geographic location of user/key fob, by other user attribute, by vehicle type, etc. Then, on a periodic basis, machine learning motion command analysis engine 288 refines motion signatures by performing machine learning using the corpus received command data as training data to refine one or more motion signatures. For example, all motion data associated with a geographic region may be used to refine a motion signature associated with a specific command to reflect geographic patterns. As another example, all motion data associated with a command type may be used to perform machine learning analysis to refine a general motion signature regardless of geographic region or user attribute.

Motion command learning and distribution server 280 then transmits the refined motion signatures to vehicle 202, which are replaced in motion and command data store 226 to provide refined motion signature generation and matching. Furthermore, the crowd sourced motion signatures may also be transmitted from vehicle 202 to key fob 250 to replace key fob stored motion signatures. Key fob motion command manager 270 may therefore use refined signatures, from either server 280 or vehicle 202, to improve the accuracy of motion command matching.

Figure 3:
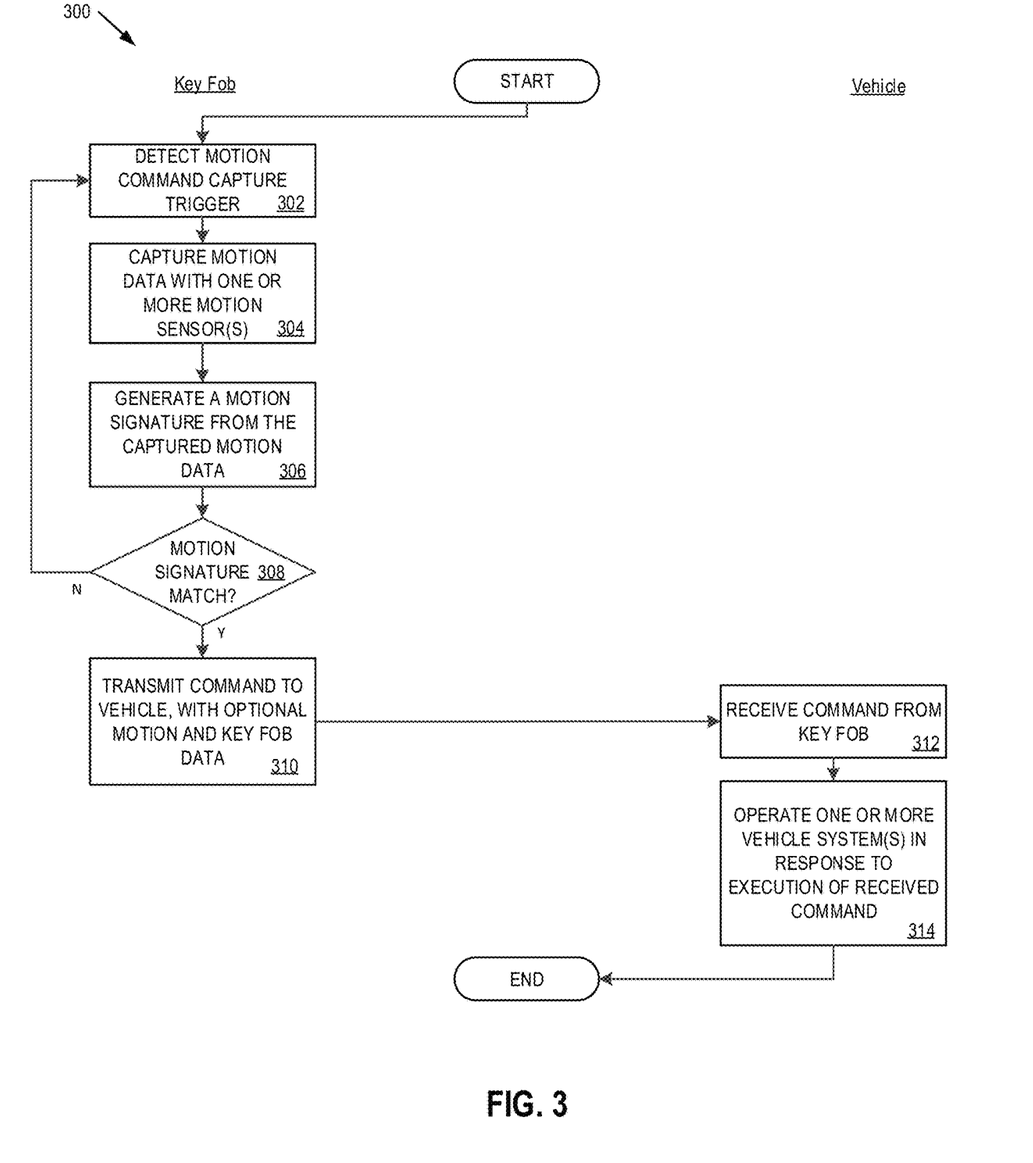
FIG. 3 is a flow diagram of one embodiment of a method for executing motion based gesture command by a key fob and a vehicle to operation one or more vehicle systems.

FIG. 3 is a flow diagram of one embodiment of a method for executing motion based gesture command by a key fob and a vehicle to operation one or more vehicle systems. The method 300 is performed by processing logic that may comprise hardware (circuitry, dedicated logic, etc.), software (such as is run on a general purpose computer system or a dedicated machine), firmware, or a combination. In one embodiment, the method 300 is performed by a key fob and a vehicle (e.g., key fob 150 or 250 and vehicle 102 or 202).

Referring to FIG. 3, processing logic begins by detecting a motion command capture trigger (processing block 302). In embodiments, the motion command capture trigger may be a signal to a key fob that a user intends to initiate motion capture for a motion command. In embodiments, the trigger may be the pressing of a button before motion associated with a motion command and/or holding down the button for the duration of the relevant motion to be captured. In embodiments, the detection of the trigger ensures that the battery of the key fob is not consumed by motion data capture when a motion command is not being intentionally made by a user.

Processing logic then captures motion data with one or more motion sensor(s) (processing block 304). In embodiments, processing logic activates an accelerometer, gyroscope, IMU, etc. to generate motion data indicative of acceleration, direction, speed, position, etc. Processing logic generates a motion signature from the captured motion data (processing block 306). In embodiments, the motion signature may be a vector, matrix, value, etc. that is generated from the captured motion data, such as acceleration measurements, force measurements, angular movement measurements, etc. generated by a motion sensor over a period of time. The motion signature may define the type of motion (e.g., clockwise rotation, zig zag down, etc.), as well as additional data, such as the speed at which the motion occurs (e.g., speed satisfying a threshold associated with fast motion, speed satisfying a threshold associated with slow motion, etc.).

Figure 7A:
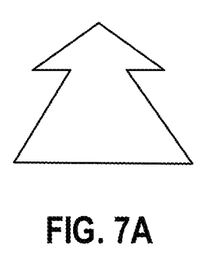
FIGS. 7A-7N illustrate exemplary motions that may be used for executing motions commands utilizing a key fob.
Figure 7B:
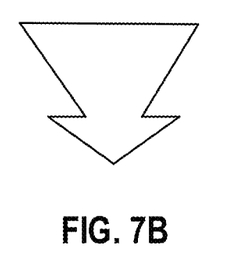
Figure 7C:
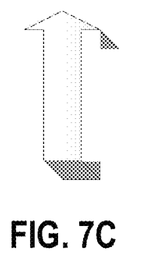
Figure 7D:
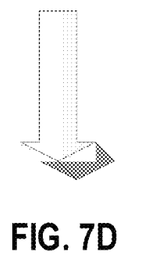
Figure 7E:
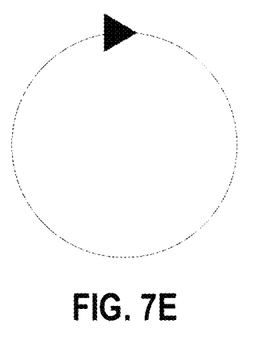
Figure 7F:
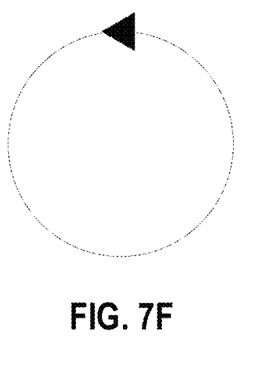
Figure 7G:
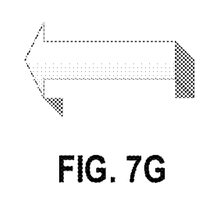
Figure 7H:
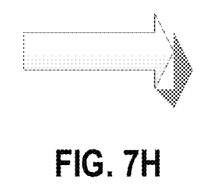
Figure 7I:
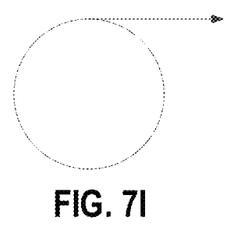
Figure 7J:
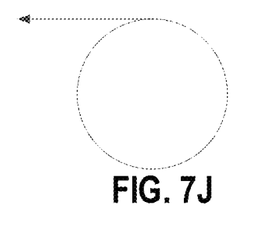
Figure 7K:
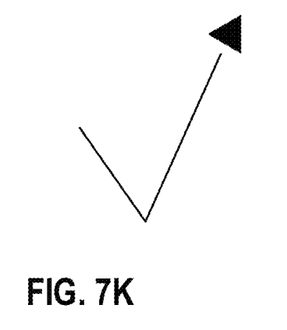
Figure 7L:
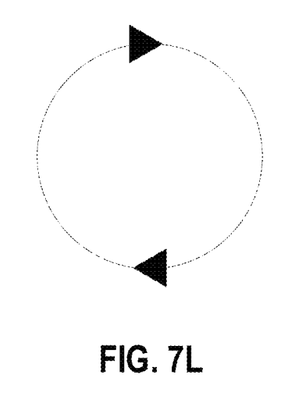
Figure 7M:
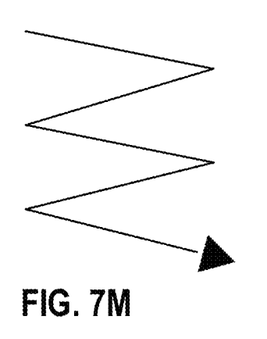
Figure 7N:
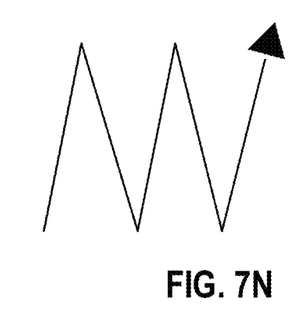

FIGS. 7A-7N illustrate exemplary motions that may be used for executing motions commands utilizing a key fob, and are described in Table 1 below. The motions may each be associated with a different function for controlling a vehicle system, and may be associated with an estimated time to completion. In embodiments, the motion timing may assist in distinguishing between multiple motions and/or excluding motions from consideration, as well as in defining specific motion signatures (e.g. by using accelerations, forces, angular movements, etc. measurements of motion sensor(s) generated over the estimated time frame of the motion). Furthermore, the embodiments discussed herein are not limited to the motions illustrated in FIGS. 7A-7N, and described in Table 1, as other motions, assigned functions, times to completion, etc. may be utilized consistent with the discussion herein.

TABLE 1

| Motion | Function | Illustrated Example | Estimated Time to Complete Motion |
| --- | --- | --- | --- |
| Forward movement (e.g., pushing) | Activate horn | FIG. 7A | 300 ms |
| Backward movement (e.g., pulling) | Flash lights (e.g., headlights) | FIG. 7B | 300 ms |
| Upward motion | Open trunk with or without powered liftgate | FIG. 7C | 300 ms |
| Downward motion | Close trunk | FIG. 7D | 300 ms |
| Circle clockwise (e.g., similar to mechanical opening of vehicle windows) | Open one or more vehicle windows | FIG. 7E | 300 ms |
| Circle counterclockwise (e.g., similar to mechanical opening of vehicle windows) | Close one or more vehicle windows | FIG. 7F | 300 ms |
| Right to left motion | Close sunroof | FIG. 7G | 300 ms |
| Left to right motion | Open sunroof | FIG. 7H | 300 ms |
| Circular motion clockwise then right | Open all windows and sunroof | FIG. 7I | 700 ms |
| Circular motion counterclockwise then left | Close all windows and sunroof | FIG. 7J | 700 ms |
| Check motion | Unlock and/or spring charge port | FIG. 7K | 300 ms |
| Double/multiple rotation | Cabin preconditioning associated with direction of rotation | FIG. 7L | 300 ms |
| Zigzag left/right | Autonomous parking | FIG. 7M | 900 ms |
| Zigzag up/down | Other assigned autonomous driving function | FIG. 7N | 900 ms |

Returning to FIG. 3, processing logic then determines if the generated motion signature matches a predefined motion signature stored in a memory of the mobile device (processing block 308). As discussed herein, a match may be determined by performing a statistical and/or other analysis to determine a similarity of the generated motion signature with predefined motion signature(s). When there is no match, such as when the generated motion signature does not match any predefined motion signatures (e.g. to a statistical significance), processing logic returns to processing block 302 to wait for the detection of the trigger. However, when there is a match, processing logic transmits the motion based gesture command associated with the matched motion signature to the vehicle, and optionally includes the motion data used by the mobile device to generate the motion signature and identifier data (processing block 310). In embodiments, the command generated from the matching of motion signatures may be generated based on detected pattern of motion, motion speed satisfying threshold values, etc. Thus, the motion based gesture command generated from patterns of movement having certain characteristics provides a user with broad control of the vehicle via the gesture commands.

Processing logic of the vehicle receives the motion based gesture command from the key fob (processing block 312), and operates one or more vehicle system(s) in response to execution of the receive motion based gesture command (processing block 314). As discussed herein, this may include configuring vehicle systems, such as activating door locks, opening or closing doors, opening or closing a trunk, activating convenience systems (e.g., heater, air condition, etc.), activating a vehicle ignition, etc., based on the received motion based gesture command.

Figure 4:
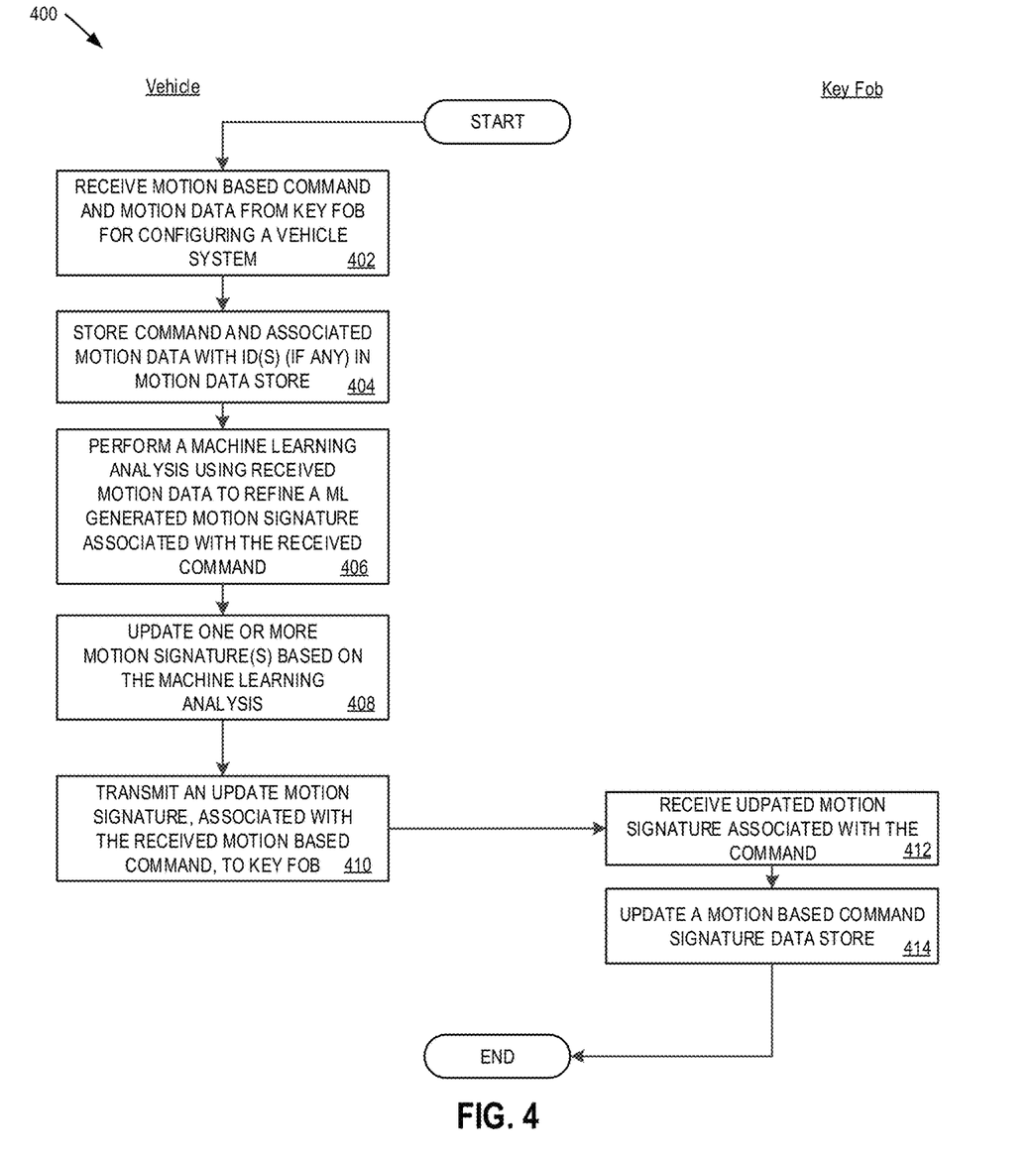
FIG. 4 is a flow diagram of one embodiment of a method for a vehicle and a key fob to refine motion signatures for motion based gesture commands.

FIG. 4 is a flow diagram of one embodiment of a method for a vehicle and a key fob to refine motion signatures for motion based gesture commands. The method 400 is performed by processing logic that may comprise hardware (circuitry, dedicated logic, etc.), software (such as is run on a general purpose computer system or a dedicated machine), firmware, or a combination. In one embodiment, the method 400 is performed by a key fob and a vehicle (e.g., key fob 150 or 250 and vehicle 102 or 202).

Referring to FIG. 4, processing logic of the vehicle begins by receiving a motion based gesture command and associated motion data from a key fob for configuration of a vehicle system (processing block 402). In one embodiment, the gesture command and motion data are received in accordance with the discussion above. Processing logic then stores the command and associated motion data with key fob/user IDs (if any) in a data store (processing block 404).

Processing logic of the vehicle performs a machine learning analysis, as discussed herein, using received motion data to refine a machine learning generated motion signature associated with the received command (processing block 406). As discussed herein, the received motion data may be used as training data for input into a machine learning system (e.g., a neural network) that refine the output (e.g., motion signature) based on the received motion data. In embodiments, processing logic may perform processing block 406 after receipt of a certain number of motion commands of a certain type (e.g., every 5, 10, 20, etc. occurrences of a motion command), after a certain amount of time has elapsed (e.g., every day, every week, every month, etc.), or on any other periodic basis. Processing logic utilizes the result to update one or more motion signature(s) (processing block 408).

Processing logic transmits the updated motion signature, associated with the received motion based gesture commands, to the key fob (processing block 410). Processing logic of the key fob receives the updated motion signature associated with the motion command (processing block 412), and stores the update in a motion based command signature data store (processing block 414). Thus, the processing logic of the key fob and the vehicle are able to refine and improve the motion signatures associated with specific commands from actual user motion data over time and from actual usage conditions. This improves the key fob's ability to recognize motion based gesture commands from captured motion data, and therefore improves the execution of vehicle configuration form the motion based gesture commands.

Figure 6:
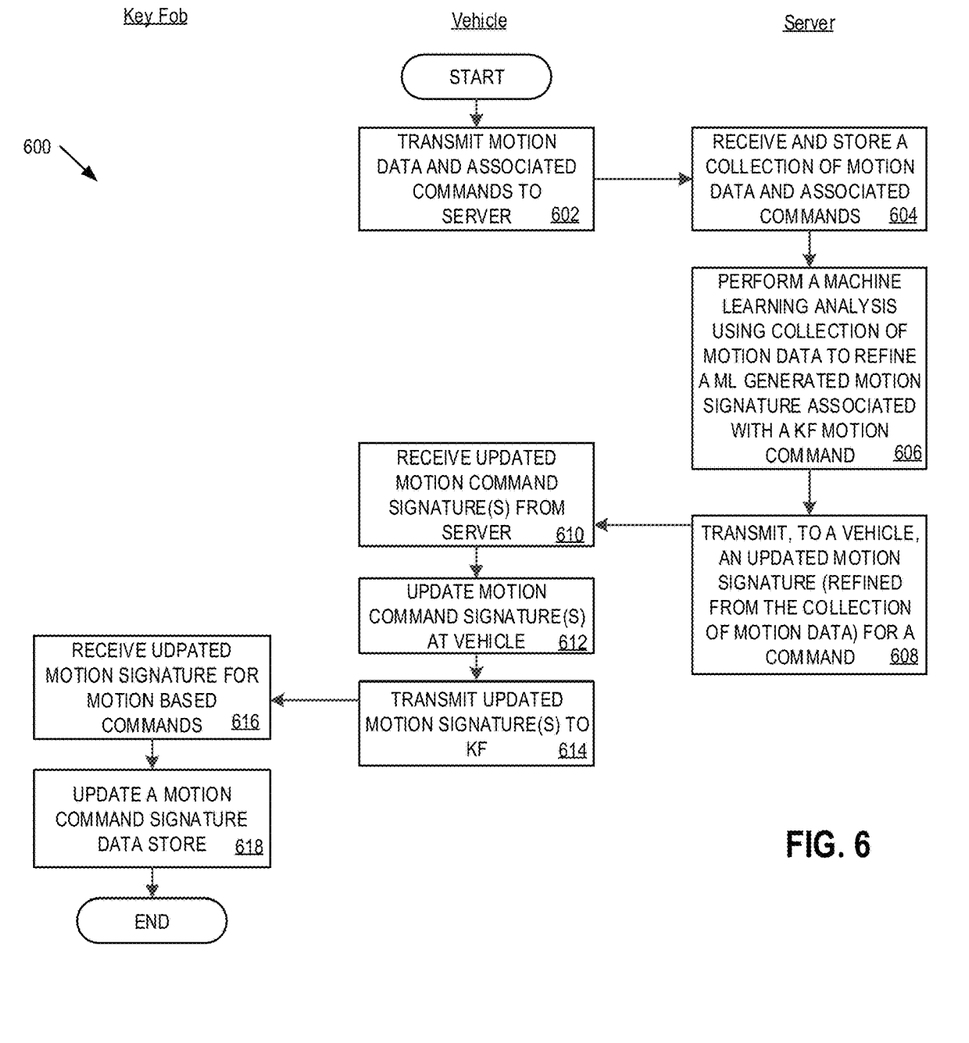
FIG. 6 is a flow diagram of one embodiment of a method for a motion command learning and distribution server to distribute refined motion signatures for motion based gesture commands to a vehicle and a key fob.

FIG. 6 is a flow diagram of one embodiment of a method 600 for a motion command learning and distribution server to distribute refined motion signatures for motion based gesture commands to a vehicle and a key fob. The method 600 is performed by processing logic that may comprise hardware (circuitry, dedicated logic, etc.), software (such as is run on a general purpose computer system or a dedicated machine), firmware, or a combination. In one embodiment, the method 600 is performed by a server, a key fob, and a vehicle (e.g., motion command learning and distribution server 180 or motion command learning and distribution server 280, key fob 150 or 250, and vehicle 102 or 202).

Referring to FIG. 6, processing logic of the vehicle begins by transmitting motion data and associated commands to a server (processing block 602), such as the motion command learning and distribution server 180. As discussed herein, the motion data is motion data captured by a key fob and determined by key fob and/or vehicle to be associated with a motion based gesture command for configuring a vehicle system. In embodiments, a plurality of motion data and associated commands may be transmitted, such as on a periodic basis, user command, upon a predefined number of commands being reached, etc.

Processing logic of the server receives and stores the motion data and commands in a collection (processing block 604). In embodiments, the collection may be sourced from a plurality of vehicle, such as vehicles 502-1 through 502-N illustrated in FIG. 5. Furthermore, the plurality of motion data and associated commands may also include identifiers, such as user, vehicle model, geography, user attribute, etc., that enables the collection of motion data and associated commands to be distinguished by the server.

Processing logic of the server performs a machine learning analysis, as discussed herein, using the collection of motion data to refine a machine learning generated motion signature associated with a key fob motion based gesture commands (processing block 606). As discussed herein, the collection of motion data serve as input data into a machine learning system (e.g., a neural network) for a command that enable the machine learning input to refine the resulting machine learning trained motion signature. The refined motion signature associated with the motion based gesture command is transmitted to the vehicle (processing block 608).

Processing logic of the vehicle receives the refined motion signature associated with the motion based gesture command from the server (processing block 610). Processing logic of the vehicle then updates the motion command signature(s) at the vehicle (processing block 612), such as updating signatures in a motion command data store. Furthermore, the signature(s) may include user-specific, key fob-specific, general, or other signatures, which may impact storage of the signatures at vehicle. Processing logic further transmits the updated motion signatures to the key fob (processing block 614).

Processing logic of the key fob receives the updated motion signatures for motion based gesture commands (processing block 616), and updates a motion command data store at the key fob (processing block 618). Thus, key fob benefits from the vehicle and server interacting to source motion data captured by a plurality of different users, key fobs, and vehicles.

Those of skill would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the methods, systems, and apparatus of the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for controlling vehicle systems, the method comprising:
   capturing motion data generated by one or more sensors of a mobile device;
   generating a motion signature, indicative of a motion of the mobile device, from the captured motion data;
   when the generated motion signature matches a predefined motion signature stored in a memory of the mobile device, transmitting a motion based gesture command associated with the predefined motion signature to a vehicle with the captured motion data; and
   operating one or more of the vehicle systems in response to a processor of the vehicle: generating a second motion signature from the captured motion data indicative of a motion of the mobile device, and in response to determining that a motion based gesture command associated with the second motion signature generated by the vehicle matches the motion based gesture command received from the mobile device, executing the received motion based gesture command.

2. The method of claim 1, wherein the memory of the mobile device stores a plurality of different predefined motion signatures each being associated with a different motion based gesture command, and wherein each of the different motion based gesture commands perform a different vehicle system operation when executed by the processor of the vehicle.

3. The method of claim 1, further comprising:
   detecting a trigger activated at the mobile device, wherein the one or more sensors are in an inactive state prior to detection of the trigger; and
   activating the one or more sensors for capture of the motion data in response to the detection of the trigger.

4. The method of claim 1, wherein the mobile device comprises a key fob.

5. The method of claim 1, wherein the mobile device comprises one of a mobile telephone, a wearable device, or a tablet computer.

6. The method of claim 1, wherein the one or more sensors comprise an accelerometer and a gyroscope.

7. The method of claim 1, wherein the one or more sensors comprise an inertial measuring unit.

8. A method for controlling vehicle systems, comprising:
   capturing motion data generated by one or more sensors of a mobile device;
   generating a motion signature, indicative of a motion of the mobile device, from the captured motion data;
   when the generated motion signature matches a predefined motion signature stored in a memory of the mobile device, transmitting a motion based gesture command associated with the predefined motion signature to a vehicle, the memory of the mobile device storing a plurality of different predefined motion signatures each being associated with a different motion based gesture command, and each of the different motion based gesture commands perform a different vehicle system operation when executed by the processor of the vehicle;
   operating one or more of the vehicle systems in response to a processor of the vehicle executing the received motion based gesture command;
   wherein the captured motion data is transmitted with the generated motion based gesture command to the vehicle further comprising:
   storing, in a memory of the vehicle, a plurality of motion data associated with the generated motion based gesture command;
   performing, by the processor of the vehicle, a machine learning analysis using the received motion data as training data to refine the predefined motion signature associated with the motion based gesture command;
   transmitting, by the vehicle, a refined version of the predefined motion signature to the mobile device; and
   replacing, by the mobile device, the predefined motion signature with the received refined version of the predefined motion signature in the memory; and
   using the refined version of the predefined motion signature in the memory for comparison against a second motion signature generated using second motion data captured by the one or more sensors of the mobile device.

9. The method of claim 8, further comprising:
   transmitting, by the mobile device, an identifier that identifies one or more of a user and a mobile device associated with the captured motion data, wherein the predefined motion signature is associated with the identifier;
   performing, by the processor of the vehicle, the machine learning analysis using the received motion data as training data to refine the predefined motion signature associated with the identifier; and
   transmitting, by the vehicle, a refined version of the predefined motion signature that is associated with the identifier to the mobile device to replace the predefined motion signature stored in the memory at the mobile device.

10. The method of claim 8, further comprising:
    transmitting, by the vehicle, the received motion data and the associated motion based gesture command to a server computer system, wherein the server computer system receives a plurality of motion data associated from a plurality of vehicle each associated with the predefined motion signature, and wherein the server computer system performs a machine learning analysis using the plurality of motion data to generate a server refined version of the predefined motion signature;

receiving, at the vehicle from the server, the server refined version of the predefined motion signature; and transmitting, by the vehicle, the server refined version of the predefined motion signature that is associated with the identifier to the mobile device to replace the predefined motion signature stored in the memory at the mobile device.

11. A system, comprising:
a mobile device comprising:
a memory to store a plurality of predefined motion signatures each associated with a motion based gesture command,
one or more sensors to capture device motion data,
a processor to: generate a motion signature, indicative of a motion of the mobile device, from the captured motion data, and when the generated motion signature matches a predefined motion signature stored in the memory, transmit a corresponding motion based gesture command to a vehicle with the captured motion data; and
a vehicle comprising:
one or more vehicle systems, and
a processor to: operate one or more of the vehicle systems in response to the processor: generating a second motion signature from the captured motion data indicative of a motion of the mobile device, and in response to determining that a motion based gesture command associated with the second motion signature generated by the vehicle matches the motion based gesture command received from the mobile device, executing the received motion based gesture command.

12. The system of claim 11, wherein each of the motion based gesture commands performs a different vehicle system operation when executed by the processor of the vehicle.

13. The system of claim 11, wherein the mobile device comprises a key fob.

14. The system of claim 11, wherein the mobile device comprises one of a mobile telephone, a wearable device, or a tablet computer.

15. The system of claim 11, wherein the one or more sensors comprise an accelerometer and a gyroscope.

16. The system of claim 11, wherein the one or more sensors comprise an inertial measuring unit.

17. The system of claim 11, wherein the mobile device further comprises:
a user interface element; and
the processor to:
detect a trigger in response to a user activating the user interface element at the mobile device, wherein the one or more sensors are in an inactive state prior to detection of the trigger, and
activate the one or more sensors for capture of the motion data in response to the detection of the trigger.

18. A system comprising:
a mobile device comprising:
a memory to store a plurality of predefined motion signatures each associated with a motion based gesture command,
one or more sensors to capture device motion data,
a processor to: generate a motion signature, indicative of a motion of the mobile device, from the captured motion data, and when the generated motion signature matches a predefined motion signature stored in the memory, transmit a corresponding motion based gesture command to a vehicle, the processor of the mobile device to transmit, using a transceiver of the mobile device, the captured motion data with the generated motion based gesture command to the vehicle;
a vehicle comprising:
one or more vehicle systems, and
a processor of the vehicle to:
operate one or more of the vehicle systems in response to the processor executing the received motion based gesture command,
store, in a memory of the vehicle, a plurality of motion data associated with the generated motion based gesture command,
perform a machine learning analysis using the received motion data as training data to refine the predefined motion signature associated with the motion based gesture command,
transmitting, with a transceiver of the vehicle, a refined version of the predefined motion signature to the mobile device; and
wherein the processor of the mobile device to:
replace the predefined motion signature with the received refined version of the predefined motion signature in the memory, and
use the refined version of the predefined motion signature in the memory for comparison against a second motion signature generated using a second motion data captured by the one or more sensors of the mobile device.

19. A non-transitory computer readable storage medium including instructions that, when executed by one or more processors, causes the one or more processors to perform operations for controlling vehicle systems, the operations comprising:
capturing motion data generated by one or more sensors of the mobile device;
generating a motion signature, indicative of a motion of the mobile device, from the captured motion data;
when the generated motion signature matches a predefined motion signature stored in a memory of the mobile device, transmitting a motion based gesture command associated with the predefined motion signature to a vehicle with the captured motion data; and
operating one or more of the vehicle systems in response to a processor of the vehicle: generating a second motion signature from the captured motion data indicative of a motion of the mobile device, and in response to determining that a motion based gesture command associated with the second motion signature generated by the vehicle matches the motion based gesture command received from the mobile device, executing the received motion based gesture command.

20. The non-transitory computer readable storage medium of claim 19, wherein the memory of the mobile device stores a plurality of different predefined motion signatures each being associated with a different motion based gesture command, and wherein each of the different motion based gesture commands perform a different vehicle system operation when executed by the processor of the vehicle.

21. The non-transitory computer readable storage medium of claim 20, wherein the operations further comprise:
transmitting, by the mobile device, the captured motion data with the generated motion based gesture command to the vehicle;
storing, in a memory of the vehicle, a plurality of motion data associated with the generated motion based gesture command;

performing, by the processor of the vehicle, a machine learning analysis using the received motion data as training data to refine the predefined motion signature associated with the motion based gesture command;

transmitting, by the vehicle, a refined version of the predefined motion signature to the mobile device; and replacing, by the mobile device, the predefined motion signature with the received refined version of the predefined motion signature in the memory; and using the refined version of the predefined motion signature in the memory for comparison against a second motion signature generated using second motion data captured by the one or more sensors of the mobile device.

22. The non-transitory computer readable storage medium of claim 21, wherein the operations further comprise:

transmitting, by the mobile device, an identifier that identifies one or more of a user and a mobile device associated with the captured motion data, wherein the predefined motion signature is associated with the identifier;

performing, by the processor of the vehicle, the machine learning analysis using the received motion data as training data to refine the predefined motion signature associated with the identifier; and transmitting, by the vehicle, a refined version of the predefined motion signature that is associated with the identifier to the mobile device to replace the predefined motion signature stored in the memory at the mobile device.

23. The non-transitory computer readable storage medium of claim 21, wherein the operations further comprise:

transmitting, by the vehicle, the received motion data and the associated motion based gesture command to a server computer system, wherein the server computer system receives a plurality of motion data associated from a plurality of vehicle each associated with the predefined motion signature, and wherein the server computer system performs a machine learning analysis using the plurality of motion data to generate a server refined version of the predefined motion signature;

receiving, at the vehicle from the server, the server refined version of the predefined motion signature; and transmitting, by the vehicle, a refined version of the predefined motion signature that is associated with the identifier to the mobile device to replace the predefined motion signature stored in the memory at the mobile device.

24. The non-transitory computer readable storage medium of claim 19, wherein the operations further comprise:

detecting a trigger activated at the mobile device, wherein the one or more sensors are in an inactive state prior to detection of the trigger; and activating the one or more sensors for capture of the motion data in response to the detection of the trigger.

25. The non-transitory computer readable storage medium of claim 19, wherein the mobile device comprises a key fob.

26. The non-transitory computer readable storage medium of claim 19, wherein the mobile device comprises one of a mobile telephone, a wearable device, or a tablet computer.

27. The non-transitory computer readable storage medium of claim 19, wherein the one or more sensors comprise an accelerometer and a gyroscope.

28. The non-transitory computer readable storage medium of claim 19, wherein the one or more sensors comprises an inertial measuring unit.

* * * * *